United States Patent [19]

Singla Casasayas

[11] Patent Number: 5,558,401
[45] Date of Patent: Sep. 24, 1996

[54] SEATS FOR BUSES AND THE LIKE

[75] Inventor: Juan Singla Casasayas, Martorelles, Spain

[73] Assignee: Fabricacion Asientos Vehiculos Industriales, S.A. (Fainsa), Martorelles, Spain

[21] Appl. No.: 242,724

[22] Filed: May 13, 1994

[30] Foreign Application Priority Data

May 14, 1993 [ES] Spain ..................... 9301049

[51] Int. Cl.$^6$ ....................................... B60N 2/24
[52] U.S. Cl. ................ 297/232; 297/452.2; 297/452.4
[58] Field of Search ............... 297/216.1, 216.2, 297/232, 233–236, 423.15, 452.18, 452.20, 452.40

[56] References Cited

U.S. PATENT DOCUMENTS

| | | |
|---|---|---|
| 2,335,234 | 11/1943 | Caesar . |
| 2,682,931 | 7/1954 | Young ................... 297/216.2 |
| 3,695,707 | 10/1972 | Barecki et al. .................. 297/452.2 X |
| 3,697,128 | 10/1972 | Strien et al. ........................ 297/216.2 |
| 3,761,127 | 9/1973 | Giese et al. ........... 297/216.1 X |
| 4,440,441 | 4/1984 | Marrujo et al. ....................... 297/216.2 |
| 4,486,047 | 12/1984 | Nagashima ...................... 297/216.1 X |
| 4,881,702 | 11/1989 | Slettebak .............................. 297/232 X |

FOREIGN PATENT DOCUMENTS

| | | |
|---|---|---|
| 263189 | 4/1988 | European Pat. Off. . |
| 330594 | 8/1989 | European Pat. Off. . |
| 383955 | 8/1990 | European Pat. Off. . |
| 1166258 | 10/1969 | United Kingdom ................ 297/216.1 |

*Primary Examiner*—Peter R. Brown
*Attorney, Agent, or Firm*—Darby & Darby, P.C.

[57] ABSTRACT

They improve the passenger's passive safety and comfort. They are comprised of a deformable frame to absorb the energy transmitted in the presence of an impact, without any portion of the same becoming detached. The design thereof has no sharp angles or edges and in the back there are perfectly inserted accessories. The footrest is also hidden without projecting, having blunt forms.

The frame has two crossbars (6) secured to the side feet (4.) The chassis or bed of the seat is formed by two triangular side plates (8, 9) braced by two cylindrical bars (13) passing through cross members (7) welded to the crossbars (6.) The back (3) is hinged to the top angular area of these plates (8, 9) and is adjustable as its frame (12) has an extension (17) connected to an adjustment mechanism (19) with an automatic instant blocking system.

Optionally, the seat on the aisle is shiftable.

The headrest is cushioned in the back since the rear frame remains lower. In this frame (38) a glass holder (46), an ashtray (43), a handle (45) and a hanger (44), and optionally a novel adjustable mirror, remain inlaid.

8 Claims, 13 Drawing Sheets

SEATS FOR BUSES AND THE LIKE

OBJECT OF THE INVENTION

As is expressed in the title of this specification, the present specification refers to improvements introduced in seats for buses and the like, which provide some advantageous and relevant features with regard to presently used seats. Besides these improvements are to mainly improve the passenger's passive safety upon having provided a frame totally apt to support an impact at an average speed, deforming itself in order to absorb the energy transmitted and without any element coming loose from the structure thereof.

The design of the seat is especially inspired not to have any edges or angles that could cause discomfort, or even injury or harm to the passenger. It also offers some totally ergonomic shapes and volumes to achieve the passenger's maximum comfort, also offering him a series of attachments or accessories mounted on the rear part of the frame, which in a closed position, do not imply any obstacle or raised portion, since they do not emerge from the rear surface.

Contributing to the latter, the rear part of the back, in its connection to the seat, is rounded and surrounds the sides, for the purpose of not being an obstacle and not causing any discomfort to the user who is seated in the seat behind, since his knees do not cause any interference above all when be is getting out of his seat.

Also contributing to the passenger's passive safety, a collapsible footrest located in the rear part of the seat is provided for and when it is in a folded or collapsed position, it does not project from the rear part of the seat either given that it is housed in a recess or indentation prepared for this purpose, not offering any sharp edges or angles either when it is in the position of use or unfolded.

Another important aim is determined by the fact that the seat, upon being one-piece, in other words, upon having the headrest integrated, it also provides a buffering feature in view of a possible impact of the passenger who is seated behind, and consequently increasing significantly the passive safety.

BACKGROUND OF THE INVENTION

In broad outline, the seats that are presently used in buses and the like, though they provide functional features common to the seat in question, they nevertheless have certain deficiencies, due to the angular shapes of the frame or rear part of the back, as well as due to the accessories included therein, some of which project outward due to their volume, thus implying a risk for passengers.

Regarding the footrests that are known to be hinged in the bottom rear part of the seat, for use by the passenger who is seated behind, though they are collapsible to hide them when their use is not required, or else to make it easier for the passenger to get out of his seat, they have prismatic shapes and supports that rigidize the footrest platform, which also projects from the primitive volume of the seat, offering sharp angles and edges that do not favour at all the paasenger's passive safety, failing to comply with the regulations in force for this purpose.

The area of the headrest of this type of conventional seat remains too rigid at the rear part, upon being too high and rugged the rear frame or casing of the back, precisely because in this area there are normally surrounding recesses with generally vertical bars as a handle. This circumstance also contributes to reducing the passenger's passive safety.

As to the frame or chassis in which the normally two seats are supported and secured, the way and means with which this anchoring is done, are not totally satisfactory because they are open and in a collision even at an average speed, they can previously come loose or after the chasis has been deformed, which implies a high risk for the passenger's passive safety.

DESCRIPTION OF THE INVENTION

In broad outline and to achieve the above proposed advantages, as well as to eliminate the present problems existing in conventional seats, the improvements introduced in seats for buses and the like, that constitute the object of the present invention, greatly improve the structure and functionality for the proposed purpose, in different parts of the seat, also including functional devices that involve great safety in their functioning and in view of a possible impact.

In the first place, as a novel and advantageous feature we can cite the fact that the frame or chassis in which the double seats are rigidly supported, is defined by two crossbars rigidly fastened to some side legs solid to the floor, carrying out the interconnection with the frames of the seats, upon the frames having some bars that pass through holes provided in the cross members welded to the crossbars of the frame, which prevents these parts from coming loose from the whole, as we have set forth above.

This way of inserting the seats themselves in the frame makes it possible to also optionally, easily and safely achieve, at the factory, that the seat on the aisle side can shift a short distance away from the other seat. Thus when the passengers consider it to be convenient, they can separate their seats for their comfort.

The frame of the back is provided with welded half shafts for rotation thereof in the holes provided in the side plates that are solid to the frame of the respective seat. The frame of the back portion is materialized by a reverse U-shaped frame whose branches have deviations to obtain an ergonomic shape of the back. One of these branches of the frame has a descending extension for hinged connection to the mechanism that adjusts the inclination of the seat, this mechanism being very effective and capable of blocking the chosen angular position in any point of its angular stroke.

This mechanism noticeably improves the complex structure that present mechanisms have for an efficient functioning, not having those pieces that can have the risk of breaking or deforming during normal functioning thereof as well as in the face of an unexpected impact. To this regard we can also say that the seat on the whole can last for an unlimited amount of time and does not require maintenance of all the functional devices, including the one we are now referring to. The adjustment mechanism has a threaded shaft, one of whose ends remains anchored, by means of a support or fork, in the extension of the frame of the back. This threaded shaft, or stud passes through a fixed piece or head of the mechanism, that remains anchored, or connected to the frame of the seat, there being a coaxial spring surrounding the stud, in the area between this head and the end hinging to the back. The moveable piece or head has in the recess for the passing of the stud, a wall obtained by the mechanizing of two holes slightly deviated angularly, one of them being smooth to permit axial movement of the threaded stud, while the other one, which breaks with the anterior one in a central point, is threaded with the same pitch and diameter as the stud. Depending on the tilt position (only movement that the head can make upon actuating upon a control solid to it), axial movement of the stud is permitted to coincide with the smooth hole, or else, the whole is blocked upon the threaded surfaces of both elements coinciding, as a toothed interconnection. It has been provided for that the stress of the helical spring is applied upon a point eccentric to the geometric axis of the threaded rod, in the head of the mechanism, precisely on the edge of a milling that the same has, thus forcing the stress itself of the spring to determine the formation of a pair of forces that force the head to take on the locking position, whereby in order to come out of this condition it is necessary to actuate the control of the same so that it turns. Upon canceling the action upon the control lever and once the back has been positioned with the required inclination, upon releasing the control lever the locking position is automatically recovered.

As to the footrest structure, as well as to the positions that it is capable of occupying, in order to remain ready for use, or else, drawn back by rotation upon the seat, without being an obstacle, we can say that it is hinged to both supports solid to the tubular crossbar of the frame for support and connection of the seats themselves. It is aided by a spring and has a useful surface for resting one's feet, notably rounded to eliminate vertical edges thereof, as well as to offer the rest of the surface thereof with a blunt contour, also remaining duly inlaid in the housing provided for in the rear part, as we have indicated above.

To contribute to the passenger's passive safety, in the rear the back has a frame that ends before reaching the headrest area, therefore it has a top elastic area in the event of a possible impact. It ends a little more after rising above a horizontal strip inlaid and divided into compartments to house in each one of them the accessories or attachments that normally exist on this type of seat. In one of them there is a collapsible ashtray; a glass holder preferably remains located in the center one which upon being extended by collapsing, a support surface is provided and another one higher up as a guardrail; in another compartment there is a tension piece occupying a diagonal position, used as a handle. In this last compartment mentioned there is also an ascending appendix that can be used as a hanger. None of these accessories projects beyond the frame, in the non-use or "folded" position.

It has also been provided for that an adjustable mirror can be advantageously assembled in the center compartment thus the mirror can be put in the place most convenient for the passenger, without taking into account the angular position the back is in, hence let us remember that the mirror is to be used by the person sitting in the seat behind. Thus it can be independent of the angulation that the back has, chosen by the passenger sitting in the seat whose mirror is being moved.

As a special characteristic of this mirror, we can say that the surface that reflects the image, can be adhered, or preferably, achieved by surface treatment of the adjustable body. To prevent it from being forced by an inept person, or even a destructive one, the body of the mirror has a side wall that extends orthogonally by the sides and bottom edge, with a shape that occupies a generally prismatic-triangular volume, so that the bottom wall is curved, thus closing access to the rear part of the front surface thereof, for any position it occupies, limited angularly by both stops.

In order to provide a better understanding of the features of the invention and forming an integral part of this specification, some sheets of drawings in whose figures with an illustrative and non-restrictive manner the following has been represented, are attached hereto:

DESCRIPTION OF THE PREFERRED EMBODIMENT

Referring to the numbering used in the figures, we can see how the improvements introduced in seats for buses and the like, which the invention proposes, have in this preferred embodiment, the essential features that we are going to specify in detail hereinafter.

Figure 3:
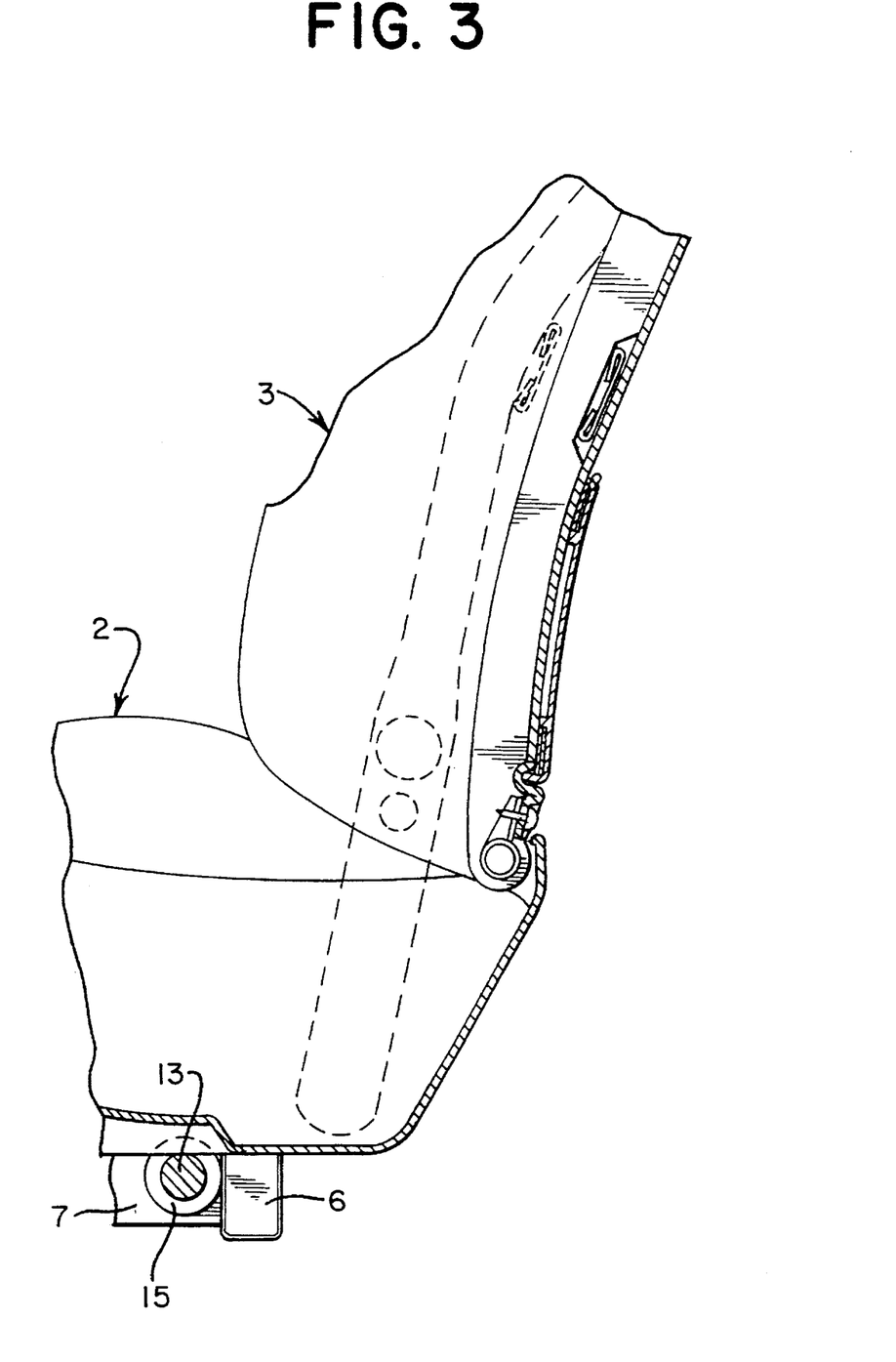
FIG. 3—It is a partial sectional raised side view of the hinging area of the back and the seat itself.
Figure 4:
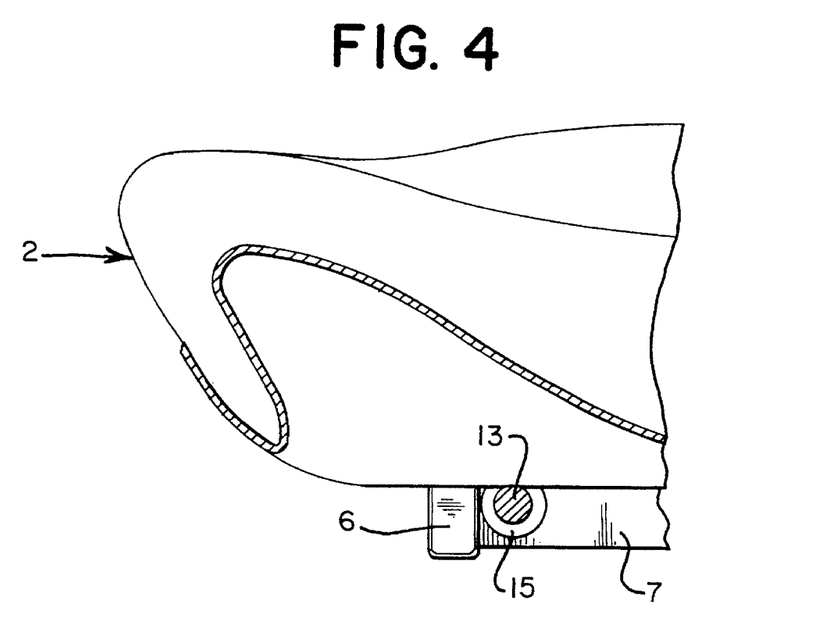
FIG. 4—It is a partial raised side view of the front part of the seat, specifically to complete the left-side area of FIG. 3.

Reference (1) designates the frame or chassis in which the two seats themselves (2) as a whole are supported. The backs (3) are hinged in top points of the side plates of the bed or frame of the seat (2), as we will see later on. Frame (1)

includes the feet or side surfaces (4) that are secured to the floor of the bus and raise the bed (5) (see FIG. 6) that fastens the seats. The fastening is done by means of screws passing through the pair of holes selected from the crossbars (6.) The crossbars (6) are tubular and have a rectangular section and they are also braced by cross members (7) (see also FIGS. 3 and 4.)

Figure 5:
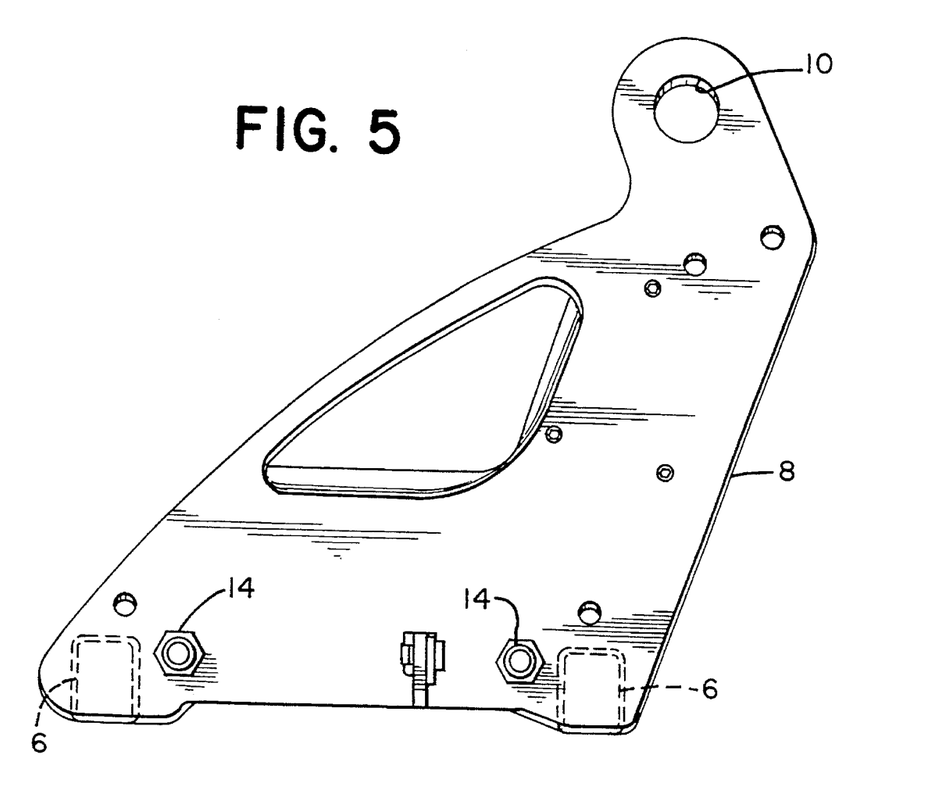
FIG. 5—It is a raised side view of the bed or frame of the seat portion.
Figure 6:
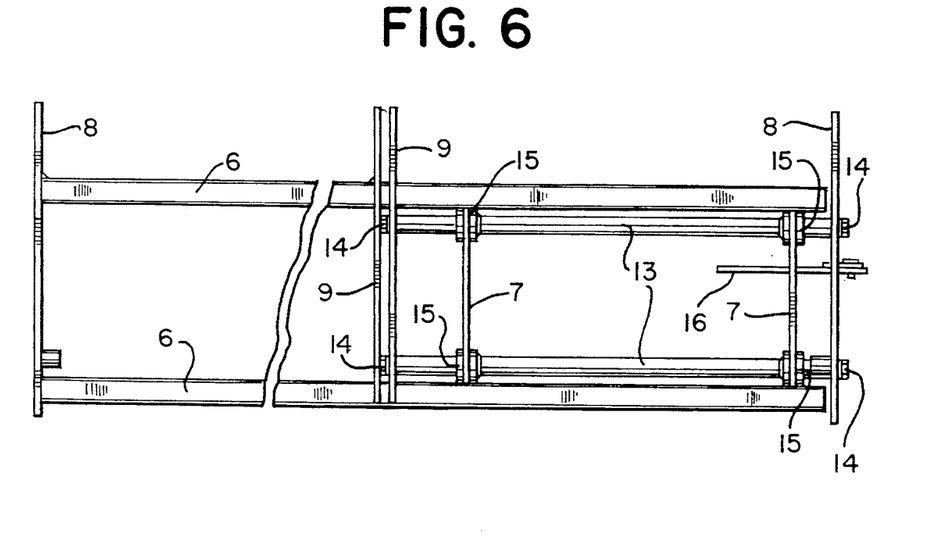
FIG. 6—It is a plan view of the two seat bed as a whole.

To the left of FIG. 6, we can see how the crossbars (6) retain welded to the side plate (7) whose geometry can be seen in FIG. 5. These crossbars (6) are also welded to one of the center plates (9), these plates (8) and (9) being the ones that comprise the sides of the seat portion placed on this side. The center side plate (9) is very similar to the end side plate (8) since it only differs in that it has some cuttings for adaptation and welding thereof to the crossbars (6), It is noteworthy that these side plates (8) and (9) include in the top angle of the general triangular shape a hole (10) for fitting in the bushings (11) welded to the frame (12) of the frame of the back (3), as we can see in FIGS. 7 and 8, materializing the hinge pin of the back with regard to the seat.

Continuing with FIG. 6, we can see that to the right of the same the structure of the bed is shown to permit side movement of the seat on the aisle, this assembly being optional as we have said above. The frame of this seat is formed by the side plates (8) and (9) which in this case are naturally not welded to the crossbars (6) of the bed, but rather they are only connected by the cylindrical bars (13) whose ends are threaded to receive the nuts (14) (see also FIG. 5.) The bars (13) pass through the bearings (15) incorporated in the cross members (7), therefore it is easily inferred that this frame can be moved to the right of FIG. 6 until the side plate (9) knocks against the bearings (15.) The limit positions are ensured with the help of the tension piece (16) that hinges in the side plate (8) and that locks in the cross member itself (7.) They are provided with the respective fastening notches.

It is understood that the seat located next to the window remains stationary upon having the sides plates (8) and (9) of its frame welded to the crossbars (6) of the bed. The seat on the aisle would be also mounted in this way when this functional use were not included.

Figure 7:
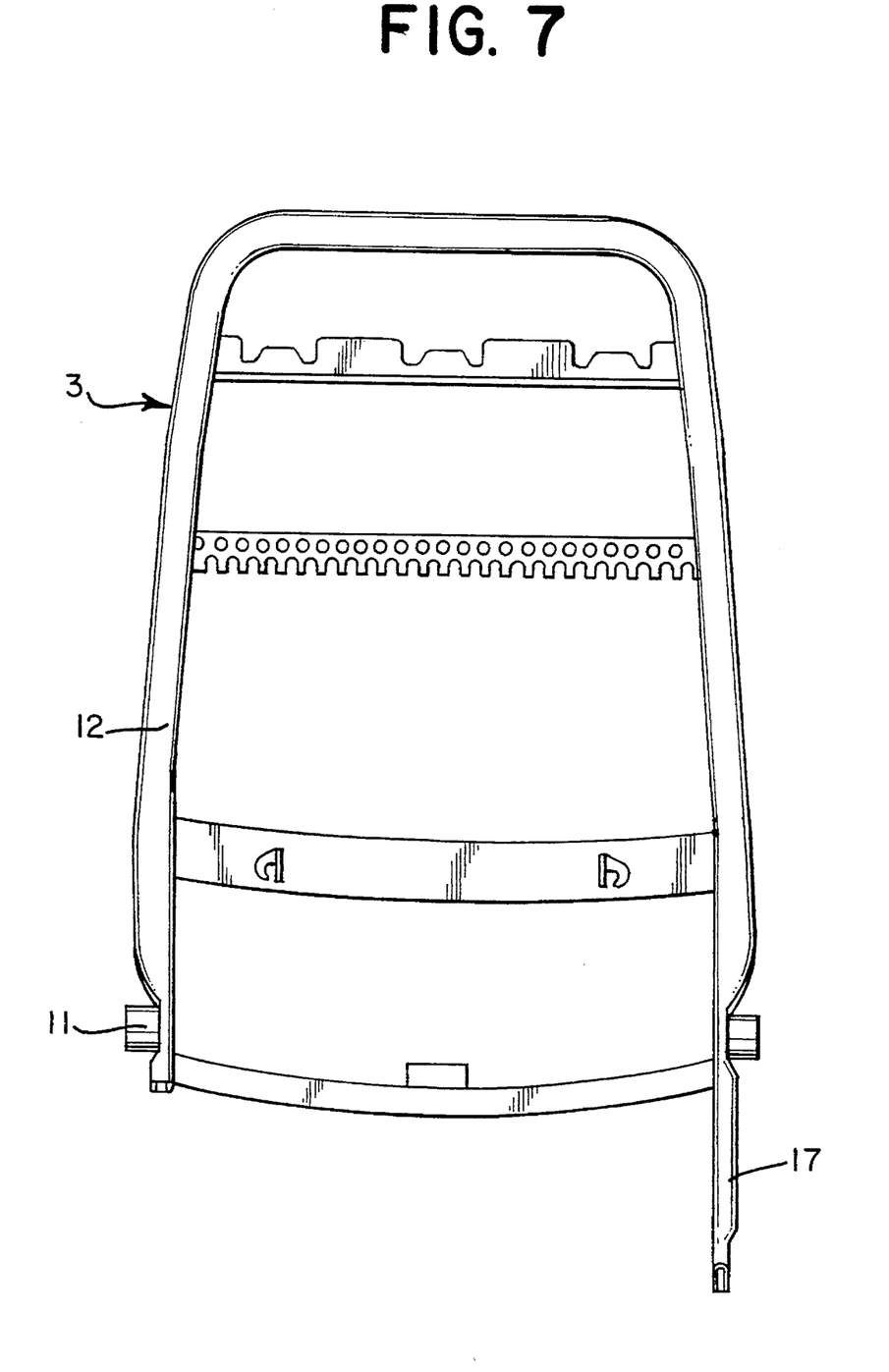
FIG. 7—It is a raised view of the seat back frame as a whole.
Figure 8:
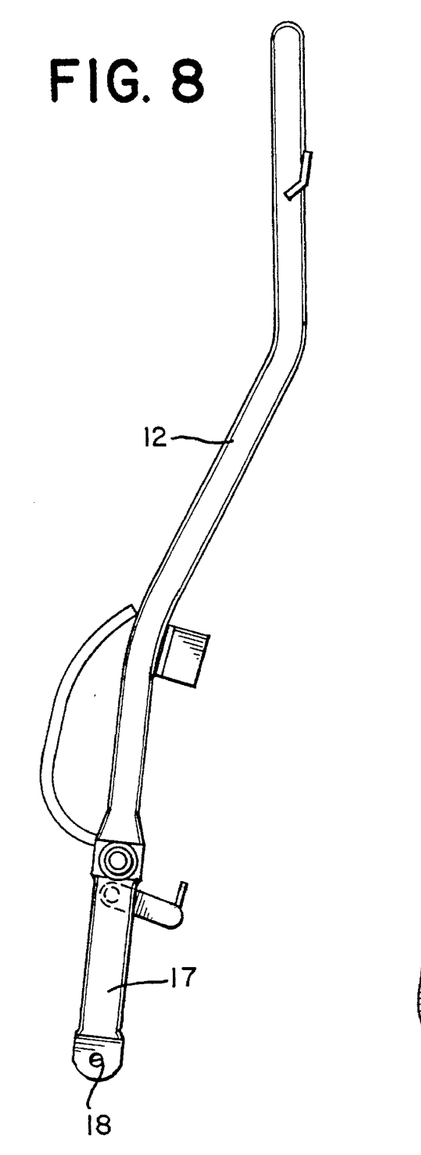
FIG. 8—It is a raised side view of what is shown in FIG. 7.
Figure 9:
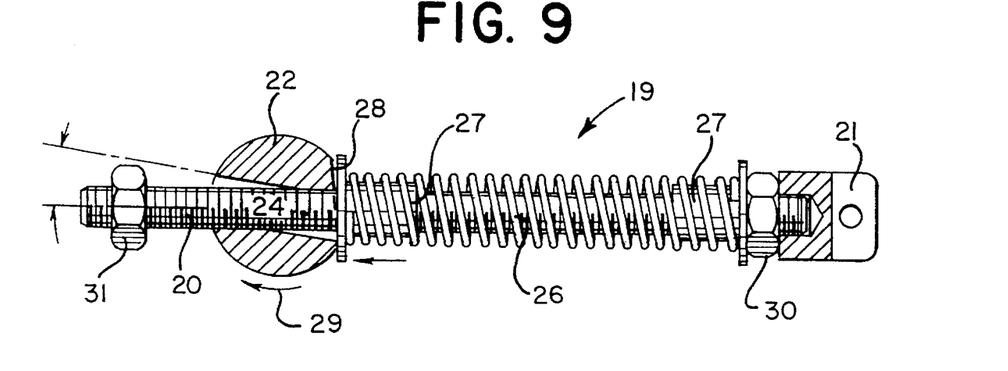
FIGS. 9 and 10—They are respective views of the locking device for setting the position of the back, in the lock position and release position, respectively, figure 10 being a partial view.
Figure 10:
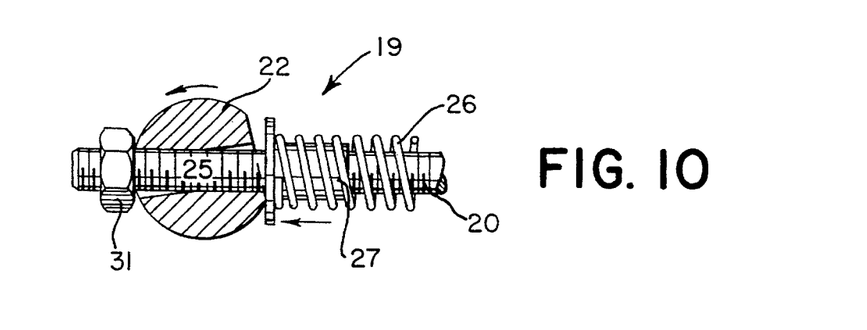

Now making special reference to FIGS. 7 and 8, we can see how the frame (12) i.e., back frame of the back (3) of the seat has a reverse U shape, one of its branches extending to define the arm of lever (17) provided with end hole (18) for hinged connection to the mechanism adjusting the inclination of the back (3), generally referred to as number (19) and whose functional structure we can see in FIGS. 9 and 10.

Figure 1:
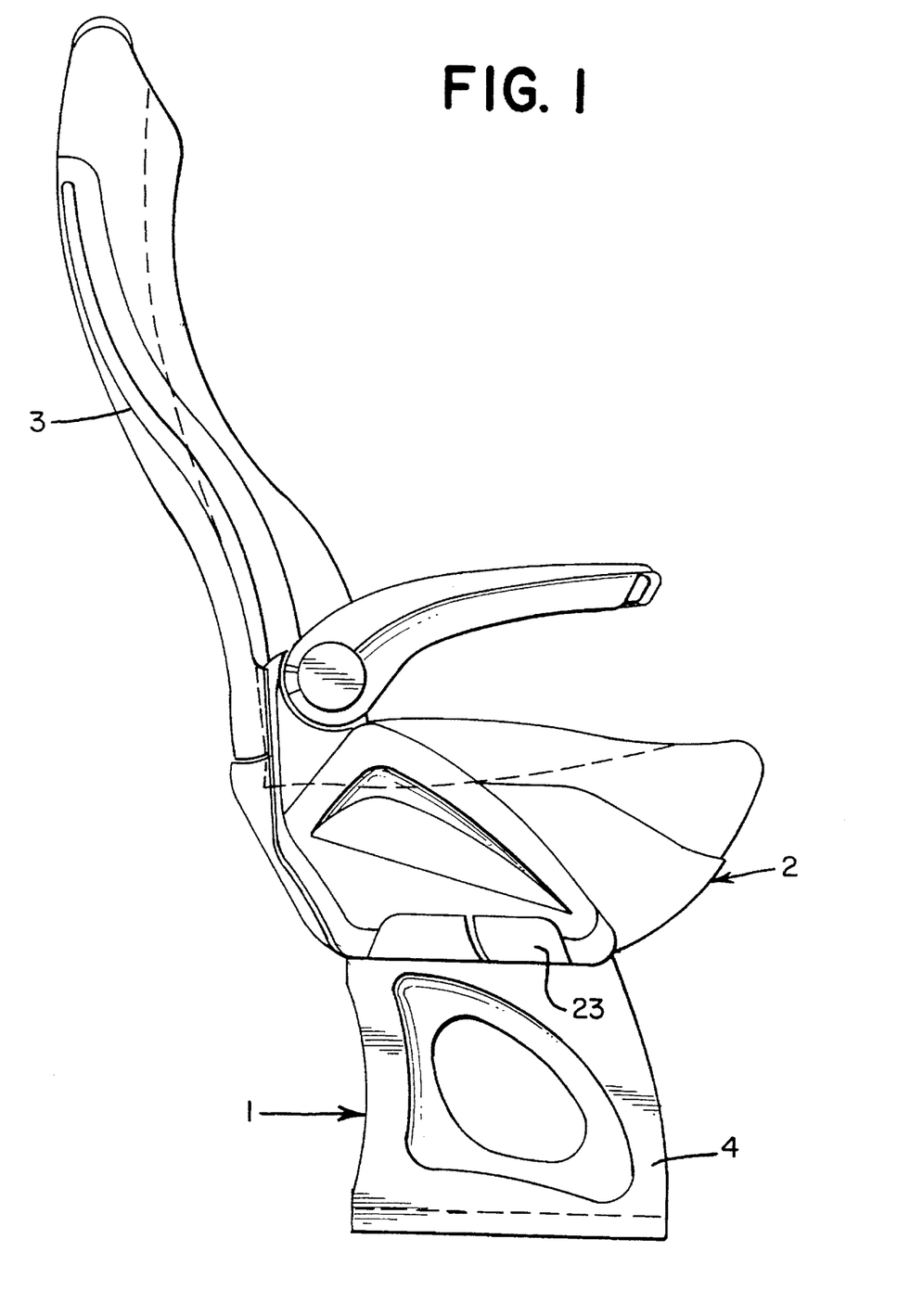
FIG. 1—It is a raised side view of a seat for buses and/the like, including the improvements object of the invention.

The cited adjustment mechanism (19) is comprised of a threaded rod (20) that ends in the connecting fork (21) hinged to the arm of lever (17) of the frame (12) of the back (3.) The control head (22), which remains located in a fixed point of the chassis of the seat (2) remains located on the threaded rod (20), having only oscillating or tilting movement around a shaft passing through the center point of the discoidal shape that it has, this movement being achieved upon having a shaft to which the operating control (23) is solid to (see FIG. 1), it being possible to tilt from the position shown in FIG. 9, to the position of FIG. 10 and vice versa.

The head (22) is provided with a pair of diametric holes (24) and (25), whose geometric axes form together a small angle α. Hole (24) is smooth and has a diameter slightly larger than that of the threaded rod (20) thus when this hole (24) is aligned with said rod (20), axial movement of the rod (20) can take place, in favor or against the spring (26) that coaxially surrounds it and that remains laid between bushings (27) that easily slide. The other diametric hole (25) is threaded with the same pitch and diameter as the threaded rod (20), therefore when the head (22) is in the position shown in FIG. 10, the locking position for the back is achieved since the helicoidal section of the threaded shaft (20) fits with the threaded locking surface of the head (22), since the threaded hole (25) coincides with the threaded rod (20.)

Thanks to the existence of the flat milling (28) of the discoidal head (22) that eliminates a segmented portion of the same, the pressure transmitted by the helicoidal spring (26) determines that the head (22) is automatically positioned under pressure, to block the mechanism, in other words, acquiring the position of FIG. 9. A turning torque in the direction of arrow (29) is formed.

When one desires to change the position of the back of the seat, it is necessary to actuate the control (23) (FIG. 1) so that the head (22) acquires the position shown in FIG. 10, the studs that define the threaded portions of the hole (25) become unlocked from the hellcoidal thread of the threaded rod (20.) When the passenger presses his back against the back (3) of the seat, or else progressively releases the pressure to prevent a sudden thrust of the same, the desired reclined position can be sought, and upon releasing the actuating lever of this mechanism rotation of the head (22) in the locking direction will be automatically achieved by the elastic stress of the helicoidal spring (26) that applies its stress in the bottom edge of the milling (28), off center with regard to the geometric axis of the threaded rod (20.)

The nuts (30) and (31) show the bottom of stroke stops, which are adjustable in order to previously set the positions of maximum and minimum angulation for the back.

Figure 11:
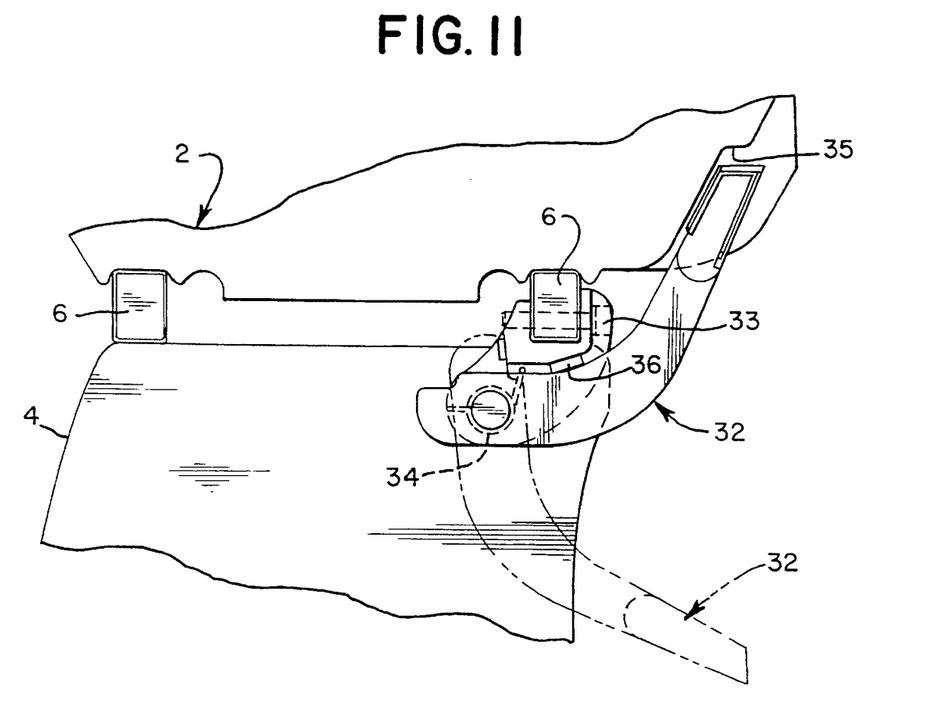
FIG. 11—It is a partial raised side view of the seat showing precisely the area where the footrest is located.
Figure 12:
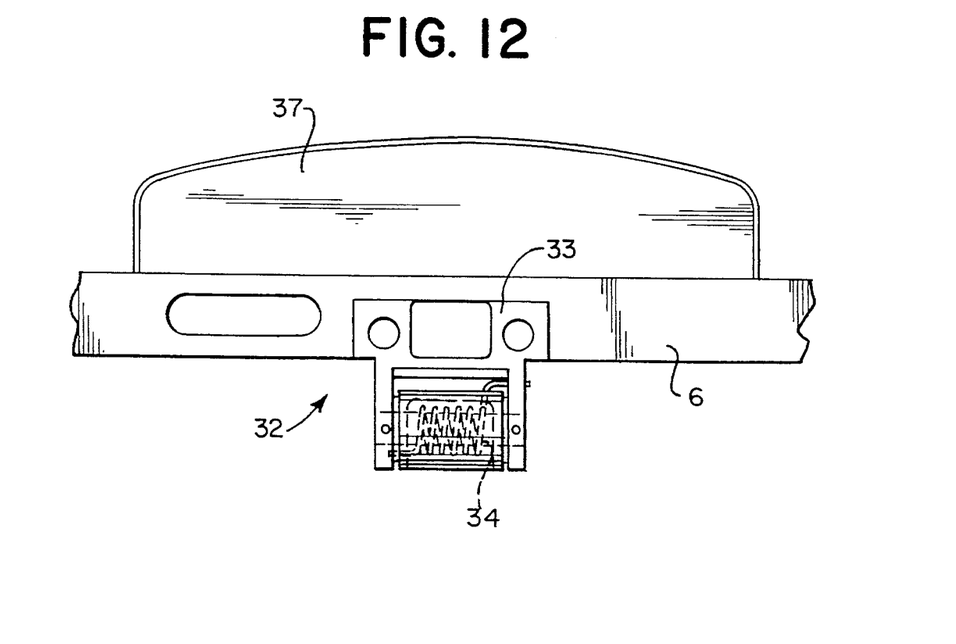
FIG. 12 It is a raised side view of that which is shown FIG. 11, showing the anchoring of the footrest.
Figure 13:
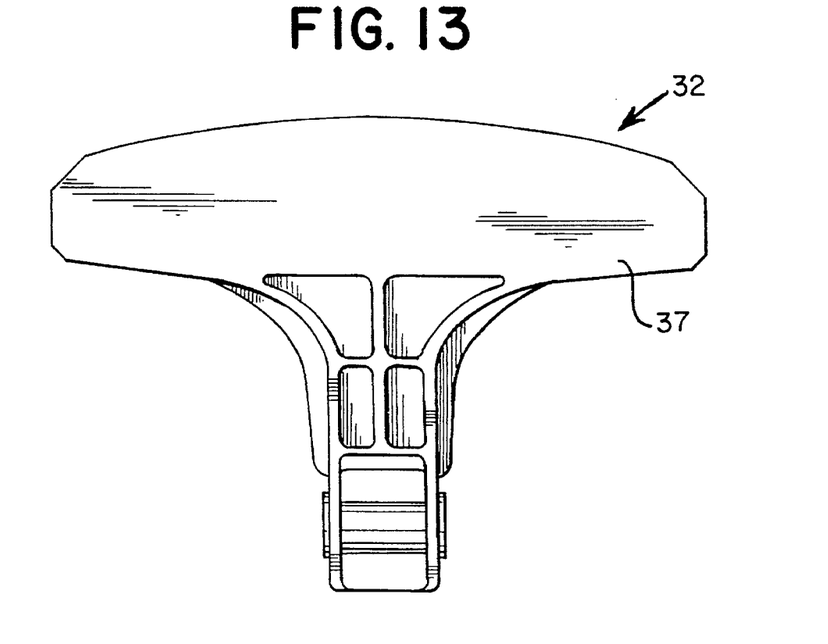
FIG. 13—It is a raised rear view exclusively of the footrest element, in a folded position.

In FIGS. 11 to 13 we can see the footrest (32) represented. With the discontinuous dash line we can see the position of use, while the continuous line shows the collapsed position so that it does not imply an obstacle for the passenger when he tries to get out of his seat. Reference (33) designates the hinging support of the footrest (32), solid to the crossbar (6) of the bed, having the shape of a fork between whose branches it is hinged. By means of spring (34) which fits with the footrest (32), the collapsed position is recovered in order to remain lodged in the rear top recess (35) of the seat (2), so that it is not an obstacle for the passenger, there being a small buffer (36.) We see that the useful surface of the footrest, referred to as (37) for resting one's feet, has a design without any sharp angles or edges, for the purpose of improving the passenger's passive safety, a purpose which the invention seeks at all times.

Figure 2:
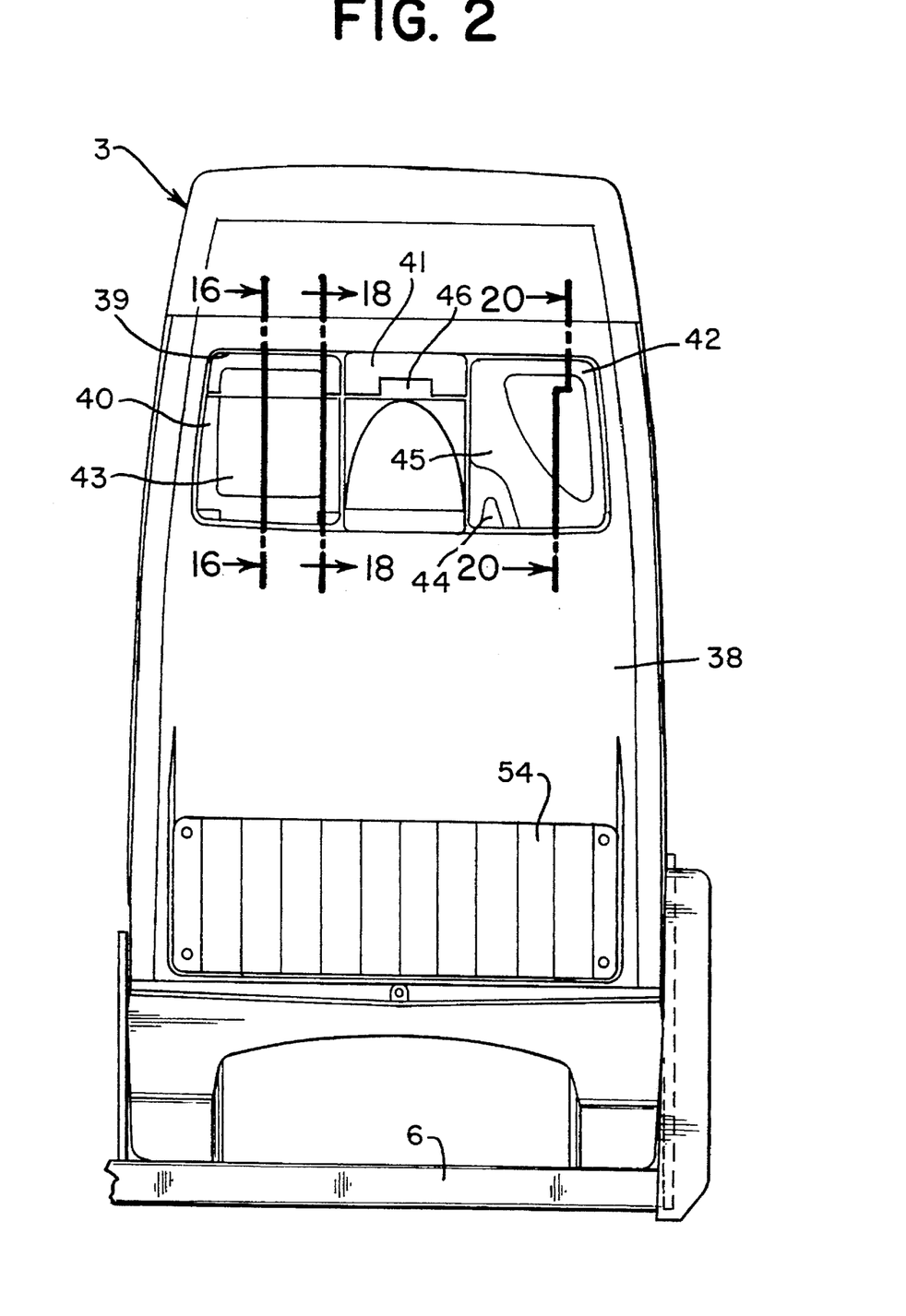
FIG. 2—It is a raised side view of FIG. 1, showing the rear part of the seat, not including the support frame and with a single seat in a two seat area.

In FIGS. 14 to 20 we can see how the frame (38) of the seat (3) has in the top area the generally rectangular and oblong recess, referred to as (39), divided into three compartments (40), (41) and (42), in this preferred embodiment. In FIG. 2 we can see a rear raised view of the accessories included in these compartments.

In compartment (40) a collapsible ashtray (43) is mounted. In FIGS. 16 to 19 we can see different plan and raised sections of this ashtray (43) in order to see its geometry and way in which its collapsing and locking is carried out.

Figure 15:
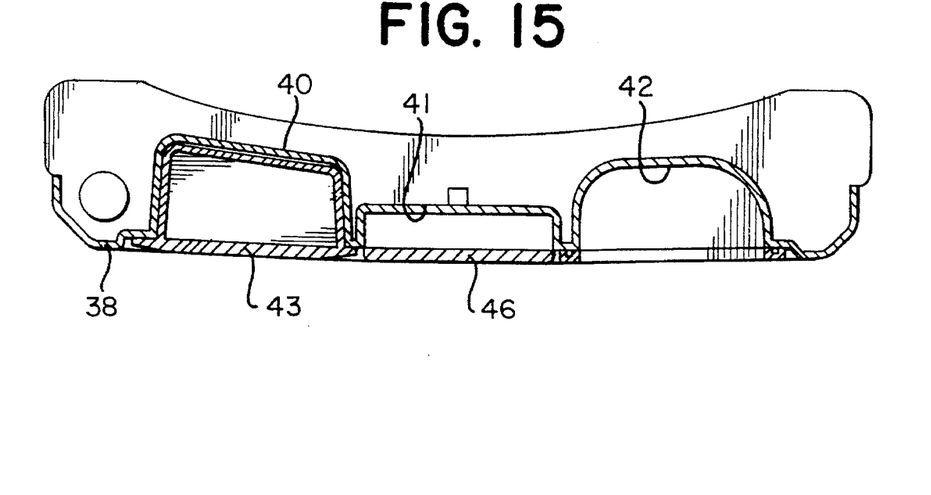
FIG. 15—It is a section along the A—A cutting line of FIG. 14.
Figure 16:
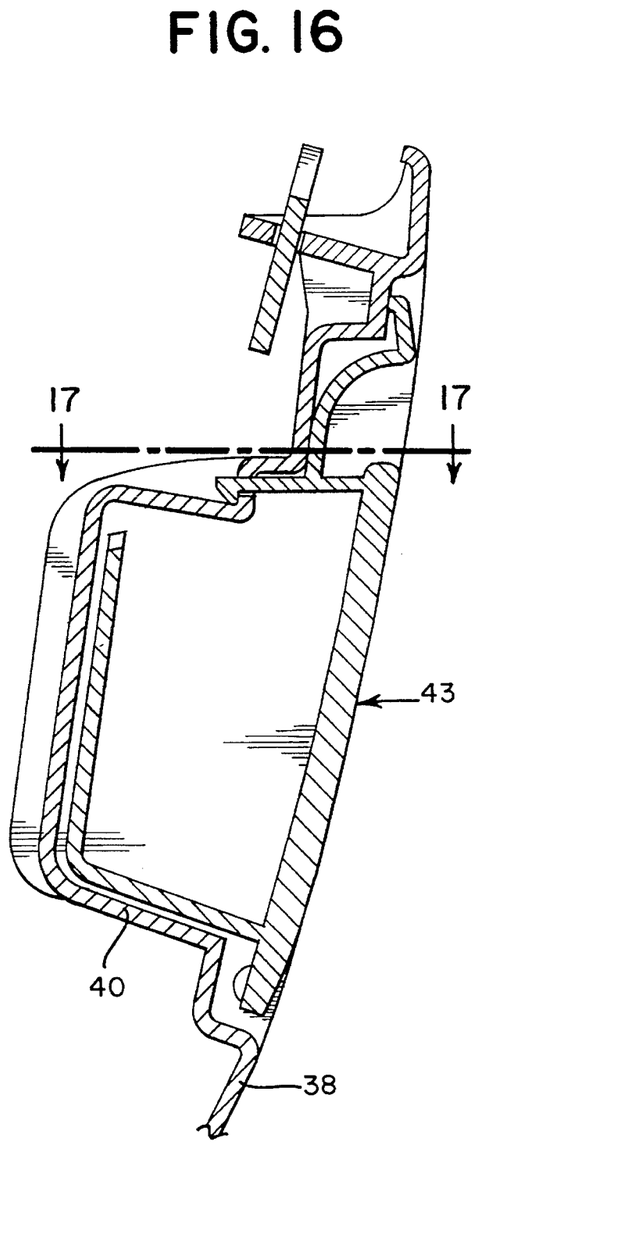
FIG. 16—It is a section along the B—B cutting line of FIG. 2.
Figure 17:
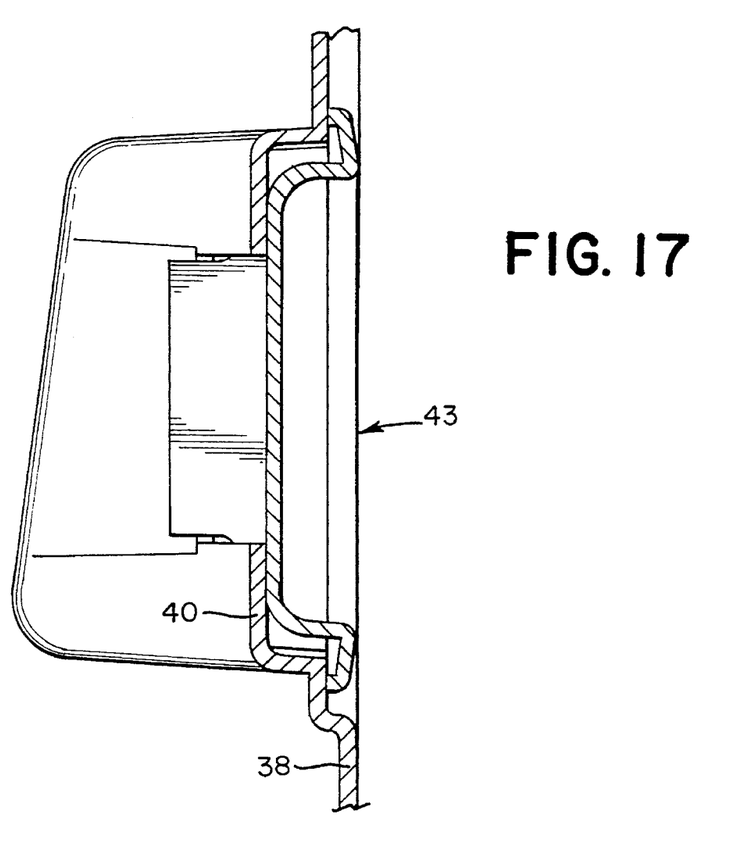
FIG. 17—It is a section along the C—C cutting line of FIG. 16.
Figures 18, 19:
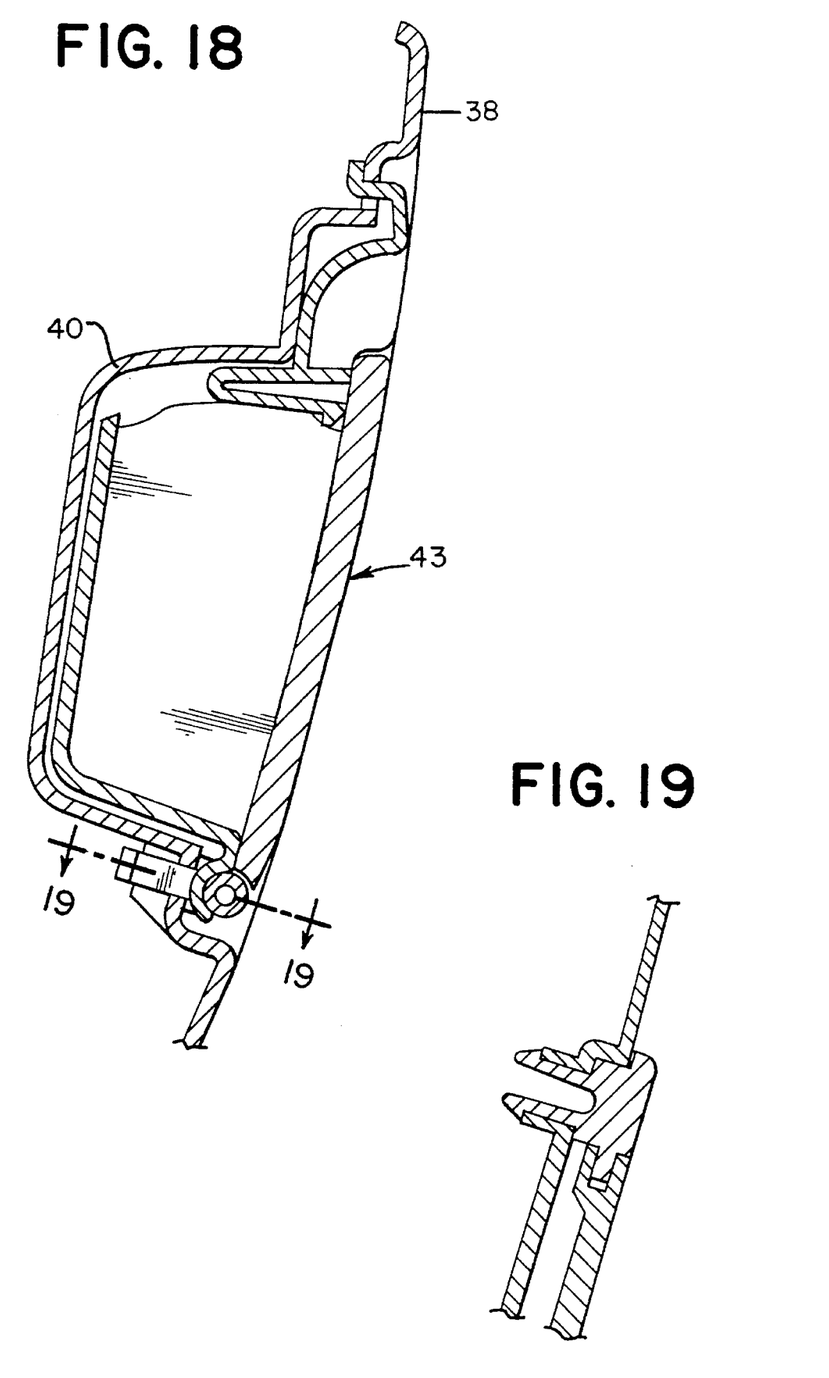
FIG. 18—It is a section along the D—D cutting line of FIG. 2.
FIG. 19—It is a section along the E—E cutting line of FIG. 18.
Figures 20, 22:
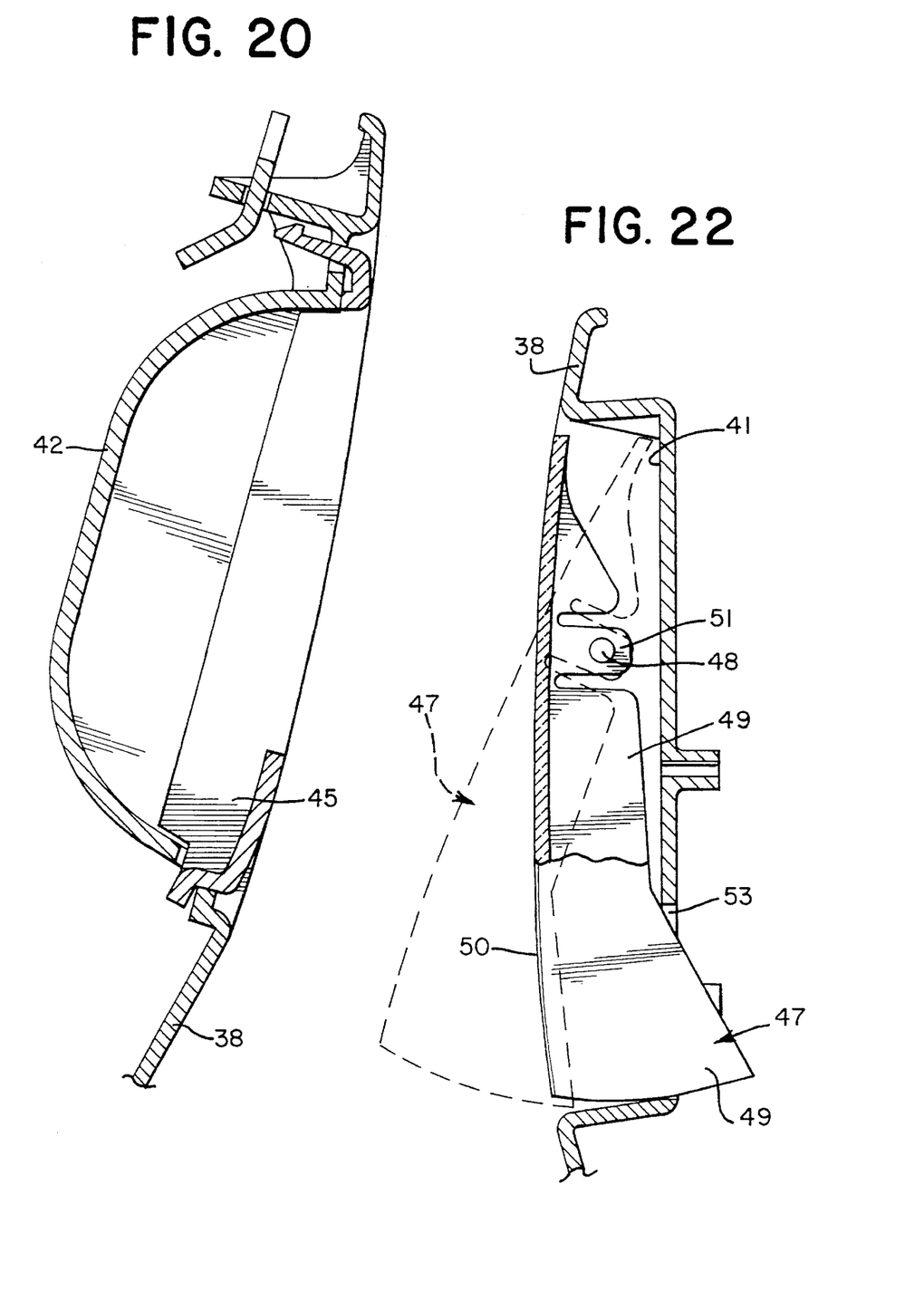
FIG. 20—It is a section along the F—F cutting line of FIG. 2.
FIG. 22—It is a section along the G—G cutting line of FIG. 21.

FIG. 20 shows a section by the cutting line F—F of FIG. 2, specifically of compartment (42) which is to house the hanger (44) and handle (45.) In FIG. 15 we can see the horizontal section of this handle and hanger compartment.

Figure 14:
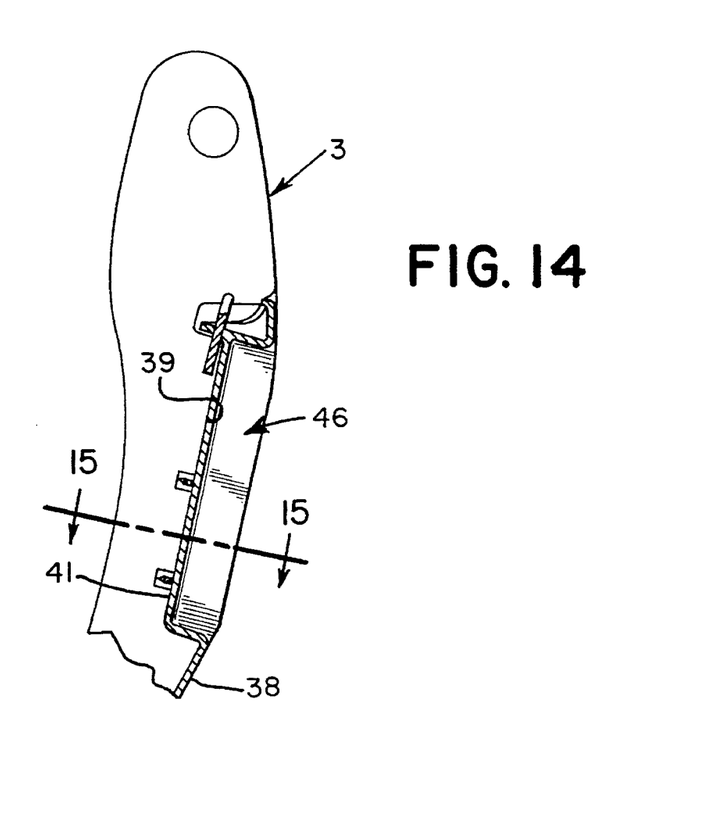
FIG. 14—It is a raised side view of the seat showing the top portion of the back of the same. This figure is complemented at the top by that which is shown in FIG. 3.

The center compartment (41) where the glass holder (46) is contained has a geometry which we can see in FIGS. 14 and 15, as well as in the rear view shown in FIG. 2.

Figure 21:
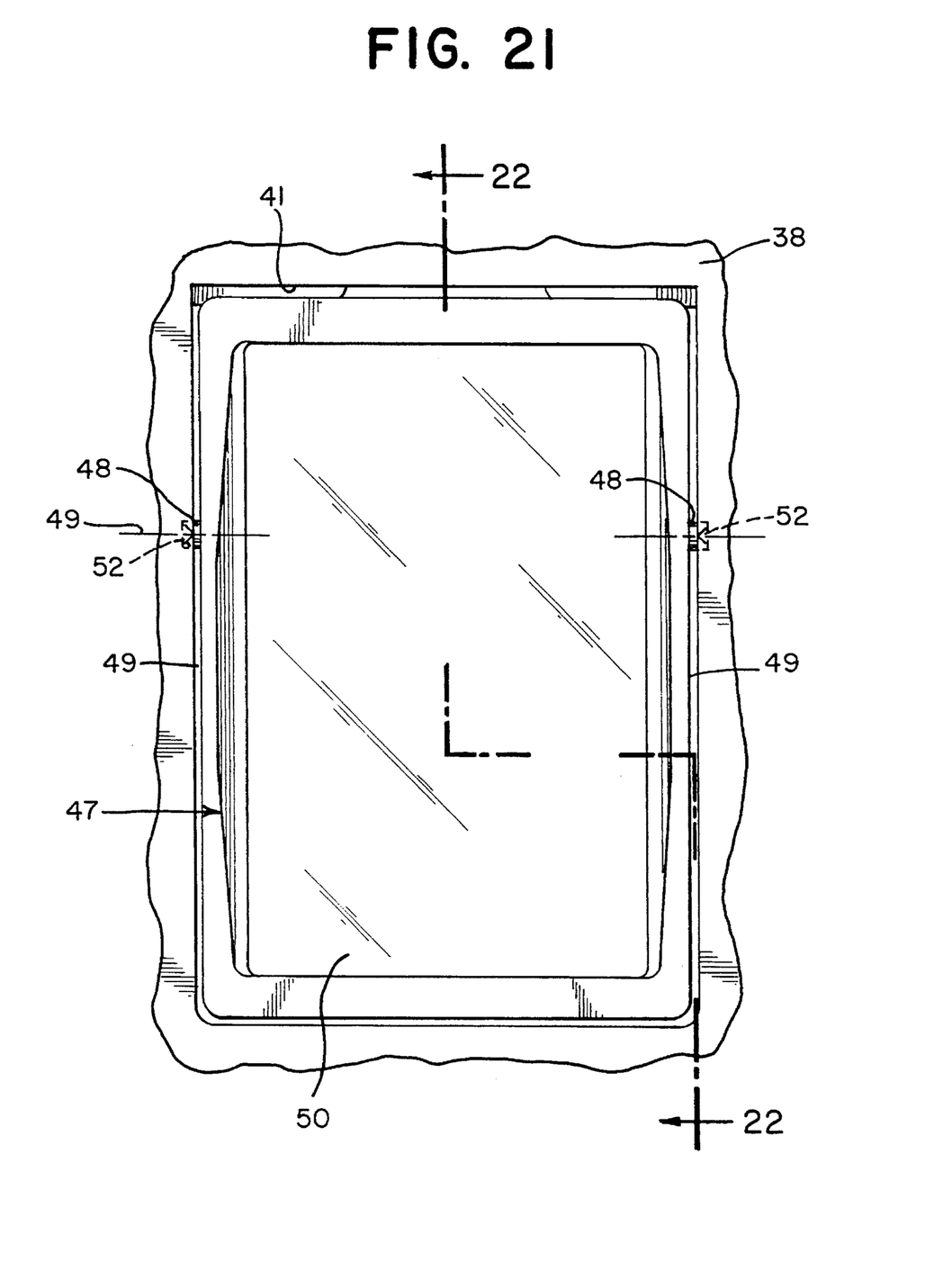
FIG. 21—It is a front raised view of the adjustable mirror insertable in the center rear area of the back.

In the center compartment (41) of the general recess (39) of the frame (38) of the back, as we have said above, an adjustable mirror, in replacement of the glass holder (46) can be mounted. The geometry of design of the adjustable mirror, as well as its mounting in this compartment (41) can be seen in FIGS. 21 and 22. The body of the mirror is referred to as number (47) and it can turn around the half shafts (48) that emerge from the side walls (49) in which the front surface (50) of the body of the mirror (47) extends, precisely where there is a pair of grooves that give rise to the formation of a tongue (51) to achieve the flexibility needed to insert the half shafts or lugs (48) in the holes (52) previously made in the side walls of compartment (41.) The side walls (49) also extend at the bottom part, though in this case with a curved shape and with the curvature center precisely in the rotation axis (48.) In this FIG. 22 we can see the two orientation limit positions of the mirror, with the continuous line being the collapsed position so that no obstacle with regard to the general surface of the frame (38) is implied and with the chain line the position of maximum angulation, precisely upon knocking against the top edge of the front surface (50), in the bottom of the compartment (41.)

The continuous line is obtained upon the sides (49) knocking against the end of the grooves (53) that permit the introduction of the bottom triangular projections of the sides, this groove continuing at the bottom part in order to also permit the passing of the bottom arched wall, advantageously provided with a stop shoulder. The front surface of the mirrir thus remains closed by all of its sides, whatever the angular position of the mirror is, since when the same is in the maximum angulation position, the inside edge of the bottom arched wall is still hiden in compartment (41.)

Reference (54) designates the elastic strip used as a bag.

I claim:

1. An improved seat structure for buses and the like, said seat structure comprising:

at least one frame including at least two feet, two seats and two backs;

at least two crossbars which are disposed substantially horizontal and parallel with respect to each other, each crossbar having two end sections, said crossbars being anchored to the frame by means of said end sections being rigidly fixed to said feet;

at least two cross members which are disposed substantially orthogonal to said crossbars and which interconnect said crossbars, each cross member having two end sections, said cross members having said end sections welded to the crossbars, each of said cross members being provided with a plurality of orifices disposed between said end sections;

at least two bars disposed substantially parallel with respect to said crossbars, said bars passing through respective ones of said orifices in said cross members;

four vertical side plates, each side plate having an essentially triangular contour, two first ones of said side plates being fixed to said crossbars, two second ones of said side plates being fixed to said bars, said two first ones of said side plates each having two lower vertices corresponding to a lower and substantially horizontal edge in the vicinity of which the side plates are fixed to said crosssbars, said two second ones of said side plates each having two lower vertices corresponding to a lower and substantially horizontal edge in the vicinity of which the side plates are fixed to said bars, each of said four side plates having a third upper vertex in the vicinity of which there are means for connecting the back pivotably to said side plates;

coupling means for coupling the seat to the side plates; and means for fastening said bars such that a lateral movement of said bars with respect to said cross members is selectively inhibited.

2. The improved seat structure according to claim 1, wherein each of the side plates has, in a portion corresponding to a top vertex of said plates, an orifice for a back frame of the back, a lower portion of said back frame being provided with a descending extension for connection thereof to a inclination adjustment mechanism for adjusting the inclination of the back.

3. The improved seat structure according to claim 2, wherein each side plate including means for anchoring armrests to said side plates, said armrests being vertically moveable to a non-use position.

4. The improved seat structure according to claim 3, wherein one of the crossbars is a rear crossbar, said rear crossbar presenting a footrest support on which a footrest is articulated.

5. The improved seat structure according to claim 4, wherein the footrest is arranged such that it can be collapsed upwards, aided by a spring, such that it remains housed in a rear recess of the back.

6. The improved seat structure according to claim 1, wherein each of the bars pass through a bearing in each orifice of said cross members, such that the bars are slidably connected to said cross member.

7. The improved seat structure according to claim 1, wherein the means for fastening the bars comprise a tension piece that hinges in the side plate and that locks in one of the cross members.

8. The improved seat structure according to claim 1, wherein the means for connecting the back pivotably to said side plates comprise holes disposed in the vicinity of each of said third upper vertices.

* * * * *